UNITED STATES PATENT OFFICE.

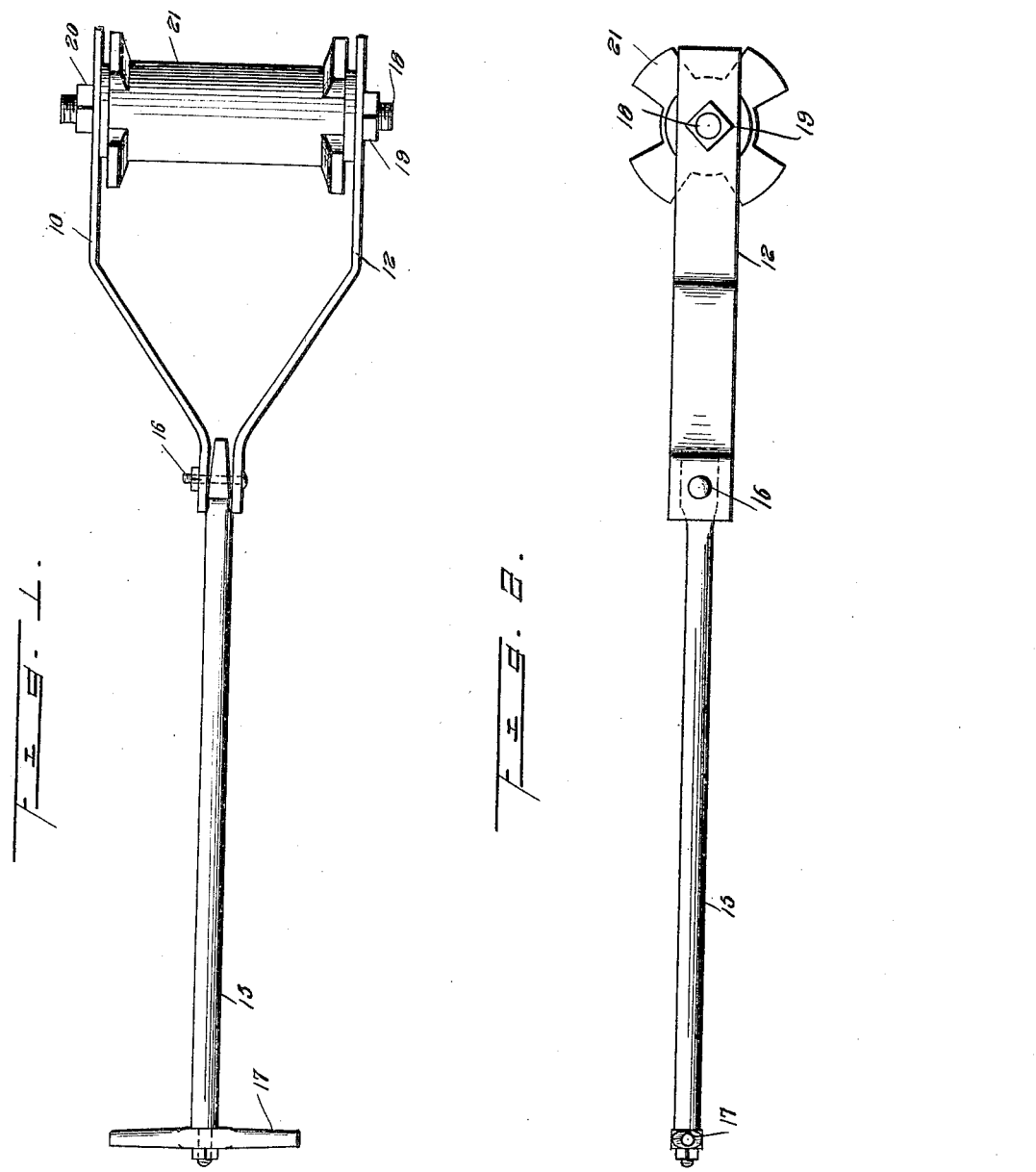

THOMAS F. WALKER, OF FRUITVILLE, FLORIDA.

REEL FOR BARBED WIRE.

1,404,672.  Specification of Letters Patent.  Patented Jan. 24, 1922.

Application filed May 11, 1920. Serial No. 380,457.

*To all whom it may concern:*

Be it known that I, THOMAS F. WALKER, a citizen of the United States, residing at Fruitville, in the county of Manatee and State of Florida, have invented certain new and useful Improvements in a Reel for Barbed Wires; and I do hereby declare the following to be a full, clear, and exact description of the invention, such as will enable others skilled in the art to which it appertains to make and use the same.

This invention relates to a reel for barbed wire, and the principal object is to provide a device which shall include a rotatable element, an axle for mounting the latter, and means of particular construction mounting the axle, the mounting means having connection with a tongue or bar provided with a handle on the free end thereof, permitting of the operation of the device in connection with the construction of fences.

A further object is to provide a device of the type indicated which shall include a rotatable element, a bail shaped frame comprising a plurality of diverging arms for mounting the axle of the reel per se, and a pivotally connected element by means of which draft may be applied in shifting a coil of wire from place to place and in paying out the wire in connection with the construction of a fence.

With the foregoing and other objects in view, the invention consists in the novel construction, combination, and arrangement of elements hereinafter described and claimed.

In the accompanying drawings

Figure 1 is a view of the device in top plan.

Figure 2 is a view in side elevation.

While the present device is referred to as a reel, it will of course be understood that the frame and essential elements associated therewith are adapted for mounting a coil of barbed wire in the form in which it is usually placed on the market—that is on a spool or the like which in itself constitutes a reel per se. However, in rebuilding a fence which has perhaps been moved from one position to another in changing the boundaries of an enclosure, the device herein referred to will include a spool or reel member per se, as an essential feature thereof.

In the preferred embodiment of my invention I provide a bail shaped member comprising a plurality of fork elements 10 and 12 of the proper weight and rigidity, and preferably formed of steel.

A bar or tongue 15 is connected in any suitable manner with the elements 10 and 12, as by means of a bolt 16 effecting pivotal connection. A handle 17 is secured to the end of elements 15, and serves an obvious purpose.

The outer ends of the fork element are each provided with a transverse aperture and the ends of the axle 18 pass through the apertures. Nuts 19 and 20 are threaded onto the ends of the axle and serve to retain the latter in position.

The reel per se is designated 21 and may readily be removed and replaced by another spool or reel by loosening one of the nuts and withdrawing the axle.

In actual use this device has proved of great value because of its simplicity and durability, and because of the fact that it may be used in narrow spaces adjacent to hedges, thickets and the like.

Having thus described my invention, what I claim is:—

1. A reeling device of the class described having a reel, a frame mounting the same, a draft tongue pivoted to the frame and said tongue at the end adjacent the reel being engageable with the ground below the frame.

2. A reeling device of the class described having a reel with ground engaging projections with the inner faces inclined inwardly from the ends toward the hub, a bolt mounting the same, frame bars supporting the bolt, nuts on the bolt engaging the frame bars, a draft tongue, a bolt pivoting said tongue to the bars, and said tongue at the end adjacent the reel being engageable with the ground below the frame.

In testimony whereof I affix my signature in presence of two witnesses.

THOMAS F. WALKER.

Witnesses:
 W. M. WALKER,
 C. E. HITCHING.